United States Patent [19]
Neumann

[11] 3,946,554
[45] Mar. 30, 1976

[54] VARIABLE PITCH TURBOFAN ENGINE AND A METHOD FOR OPERATING SAME

[75] Inventor: Gerhard Neumann, Swampscott, Mass.

[73] Assignee: General Electric Company, Cincinnati, Ohio

[22] Filed: Sept. 6, 1974

[21] Appl. No.: 503,752

[52] U.S. Cl. .............. 60/204; 60/226 A; 415/1; 415/130; 415/149 A
[51] Int. Cl.² .......................................... F02K 3/06
[58] Field of Search...... 60/226 R, 226 A, 262, 204; 415/1, 149 A, 149 R, 130

[56] References Cited
UNITED STATES PATENTS

| | | |
|---|---|---|
| 3,449,914 | 6/1969 | Brown............................. 60/226 R |
| 3,468,473 | 9/1969 | Davies et al. ..................... 60/226 R |
| 3,476,486 | 11/1969 | Davies et al. ..................... 60/226 R |

*Primary Examiner*—William L. Freeh
*Assistant Examiner*—Robert E. Garrett
*Attorney, Agent, or Firm*—Derek P. Lawrence; Lee H. Sachs

[57] ABSTRACT

Variable geometry guide vanes are provided in a variable pitch turbofan assembly. A method is disclosed for reducing aerodynamically induced stresses in the variable pitch fan blades as the blades are changed between the forward and reverse pitch modes. The guide vane geometry is scheduled to change in a manner to control the flow into and out of the fan blades in order to establish a favorable aerodynamic environment during the transition between the forward and the reverse pitch modes.

19 Claims, 5 Drawing Figures

U.S. Patent   March 30, 1976   Sheet 1 of 2   3,946,554
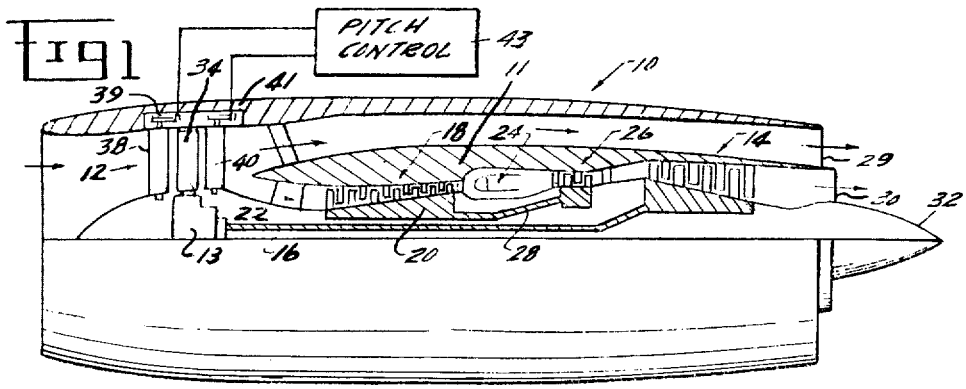
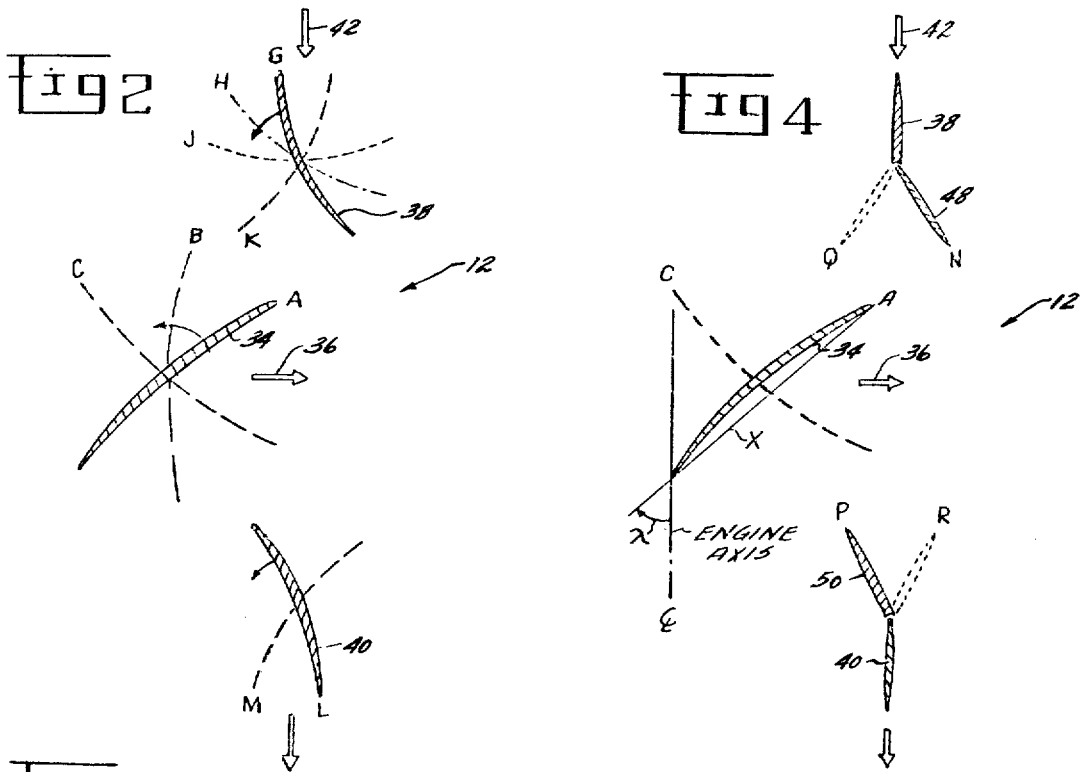
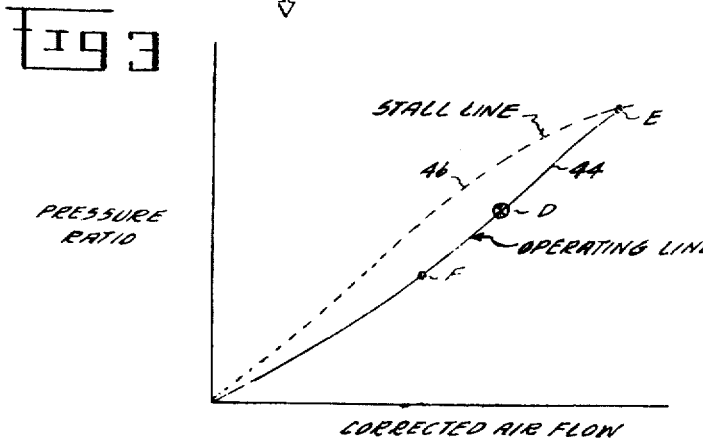

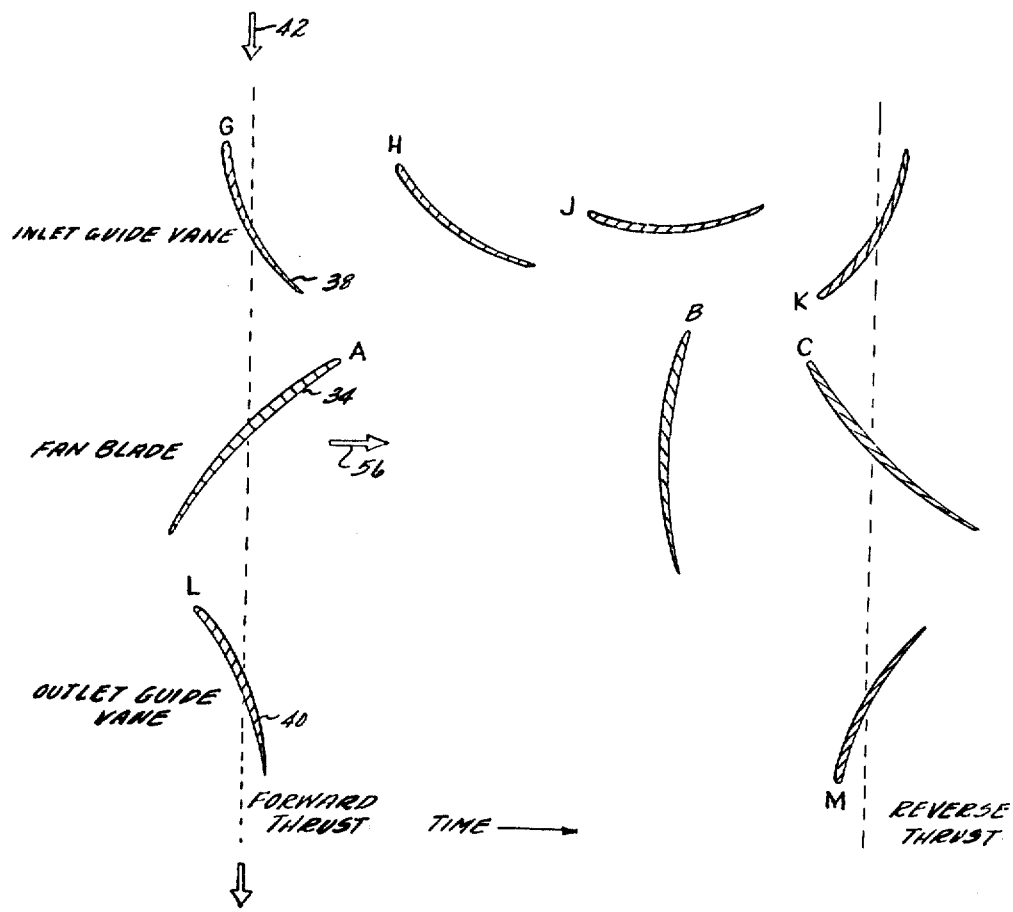

VARIABLE PITCH TURBOFAN ENGINE AND A METHOD FOR OPERATING SAME

BACKGROUND OF THE INVENTION

Jet engines for powering aircraft obtain subsonic performance improvements by use of a fan, in essence a shrouded propeller. The fan is rotatably driven, through a shaft connection, by the turbine portion of the engine and serves to pass a large volume of air around the engine, thereby increasing overall engine thrust. In fact, in recent typical commercial fan engines, the fan moves several times as much air as is taken in by the engine compressor. More recently, extensive work has been directed toward varying the pitch of the fan blades. It is believed that many of the same advantages can be obtained as are available with variable pitch propellers since fans are, in reality, directly analogous to propellers with shrouds.

Accordingly, the variable pitch fan is being considered for application on high bypass turbofan engines for improved performance in several areas: noise reduction, thrust reversal, improved thrust response, and overall engine performance. For instance, full reversible variable pitch fans have been proposed for high bypass ratio engines on STOL-type (short take-off and landing) transports. Cascade-type and target-type thrust reversers which change the direction of the fan air flow passing around the engine (the bypass stream) become large and heavy so that it is highly desirable to find alternative means for generating decelerating thrust. It is possible to generate substantial reverse thrust in a high bypass ratio fan through fan blade pitch reversal which induces pumping of the air flow through the fan blading in the reverse direction.

It is possible to actuate the blades in either of two directions from their normal position to achieve reverse thrust. The blades may be actuated through feather (counterclockwise looking down at the blade tip of a rotor which is rotating clockwise aft looking forward) or through flat pitch (clockwise looking down at the blade tip). Actuating the blades through either position from the forward to the reverse thrust modes may cause the blade stresses to be unacceptably high. Actuation through feather induces high incidence angles (the difference between the air angle ahead of the fan in the relative frame and the fan blade leading edge metal angle, both measured from the axial direction) and as a result there is the danger of blade stall (i.e., the inability of the flow to remain attached to the fan blade with a resultant loss in fan pumping capability). Peak stresses occur just prior to clearing stall in the reverse thrust direction when actuating through feather. Actuation through flat pitch may cause lower peak blade stresses during the transition, but unacceptably high stresses may persist during the reverse thrust mode since the blade camber during reverse pitch is in the wrong direction. Since the camber is in the wrong direction, the fan blade is continually in at least a mild stall during this mode.

The problem facing the aerodynamic and mechanical designer, therefore, is that a fan blade designed for optimum performance in the forward thrust mode wil not be optimized for reverse thrust operation. Compromises which benefit reverse thrust operation invariably have been detrimental to forward thrust operation. The present invention will solve this problem by orienting the air flow into and out of the variable pitch fan blade in a predetermined relationship with the change in pitch of the fan in order to reduce aerodynamically induced stresses in the variable pitch fan blades as these blades change from the forward to the reverse thrust modes. While the present invention will aid the forward and reversed thrust steady-state operation, more importantly, it will also improve flow conditions and eliminate the stall problem during the fan blade transition. Prior state of the art attempts to solve this problem have been oriented toward strengthening the fan blade in order to withstand the high stresses. This results in thick, long-chorded blades, which are detrimental to fan aerodynamic performance, particularly in the hub region, and in added weight, which is obviously undesirable in any aircraft application.

SUMMARY OF THE INVENTION

Accordingly, it is the primary object of this invention to reduce aerodynamically induced stresses in variable pitch fan blades as the fan blades change from the forward to the reverse thrust modes.

Briefly stated, the above object is attained by providing a variable pitch turbofan engine with variable guide vanes and by scheduling, through a control means, the change in pitch of the fan guide vanes in a predetermined relationship with the change in pitch of the fan blades. In an alternative embodiment, the change in flow field into and out of the reverse pitch fan blades is accomplished by varying the camber of fan guide vanes in conjunction with, or independently of, the change in pitch of the guide vanes in a predetermined relationship with the change in pitch of the fan blades.

DESCRIPTION OF THE DRAWINGS

While the specification concludes with claims particularly pointing out and distinctly claiming the subject matter which is regarded as part of the present invention, it is believed that the invention will be fully understood from the following description of the preferred embodiments, which is given in connection with the accompanying drawings, in which:

FIG. 1 is a schematic representation of a gas turbine engine incorporating the subject invention;

FIG. 2 is a schematic representation of a reversible pitch fan assembly incorporating the subject invention, looking at the blade tip of a rotor, which is rotating clockwise with respect to a viewer positioned aft of the engine and looking forward;

FIG. 3 is a partial performance map of a typical reversible pitch fan blade;

FIG. 4 is a schematic representation, similar to FIG. 2, of an alternative embodiment of the subject invention; and FIG. 5 is a time variable schematic representation of the reversible pitch fan assembly embodiment of FIG. 2.

DESCRIPTION OF A PREFERRED EMBODIMENT

Referring to the drawings wherein like numerals correspond to like elements throughout, reference is initially directed to FIG. 1 wherein an engine 10 embodying the present invention is diagrammatically shown. This engine may be considered as comprising a core engine 11, a variable pitch fan assembly 12, a variable pitch fan actuating mechanism 13, and a fan turbine 14 which is interconnected to the fan assembly 12 by a shaft 16. The core engine 11 includes an axial flow compressor 18 having a rotor 20. Air entering inlet 22 is compressed and then discharged to a combustor 24 where fuel is burned to provide high energy combustion gases which drive a turbine 26. The turbine 26, in turn, drives the rotor 20 through a shaft 28 in the usual manner of a gas turbine engine. The hot gases of combustion then pass to and drive the fan turbine 14 which, in turn, drives the fan assembly 12. These hot combustion gases are then discharged from a core engine or primary nozzle 30 defined in part by plug 32. The propulsive force is obtained by the action of the fan assembly 12 discharging air through a fan nozzle 29 and by the discharge of the combustion gases from the core engine nozzle 30. The above description is typical of many present-day turbofan engines but is not meant to be limiting, as it will become readily apparent from the following description that the present invention is capable of application to any gas turbine engine which includes variable pitch fan blading. For example, the fan may be gear driven by the same turbine which drives compressor rotor 20 and may be relatively remote or proximate to the core engine 11. The above description, and the engine depicted in FIG. 1, are therefore merely meant to be illustrative of one potential type of application.

Reference is now directed to FIG. 2 wherein the fan assembly 12 of FIG. 1 is shown to include a plurality of fan blades 34 adapted to rotate in the direction indicated by arrow 36, a first plurality of radially extending, nonrotatable, variable pitch guide vanes 38, which comprise an inlet guide vane cascade axially disposed upstream of the fan blades 34 in the forward thrust mode, and a second plurality of radially extending, nonrotatable, variable pitch guide vanes 40, which comprise an outlet guide vane cascade axially disposed downstream of the fan blades 34 in the forward thrust mode. The flow direction into the inlet guide vanes 38 in the forward thrust mode is represented by arrow 42.

In typical prior art devices, air flow entering the fan assembly is turned by the inlet guide vanes 38 so as to be properly oriented with respect to the rotating fan blades 34 which pressurize the air. Because the fan blades change the flow direction, the outlet guide vanes 40 are provided to turn the flow back to axial prior to discharge through the fan nozzle 29 or the core engine inlet 22.

In prior art devices, the inlet guide vanes 38, the fan blades 36 and the outlet guide vanes 40 are all usually disposed at predetermined, fixed pitch angles optimized to a particular design operating condition represented by point D on a typical fan performance map (FIG. 3). Pitch angle is defined as the angle λ measured from the engine axial direction to a straight line X constructed through the leading and trailing edges of the fan blade (see FIG. 4). On such a performance map as FIG. 3, fan assembly total pressure ratio is plotted as a function of corrected air flow through the fan. The locus of points representing the typical operating range of the fan assembly is indicated as the operating line 44, whereas the locus of points at which the fan experiences aerodynamic stall is indicated as the stall line 46. Generally speaking, the relationship of the lines 44 and 46 to each other is determinative of fan stall margin as is known to those skilled in the art. Where the operating line 44 intersects the stall line 46, as at point E, there is zero stall margin and the fan blades 36 experience aerodynamic stall. Therefore, rotating turbomachinery is designed to operate, typically, at some point, as at D, wherein there is adequate stall margin to preclude minor transient disturbances migrating the fan blades 36 into stall.

More recent developments in the state of the art have included the addition of a variable pitch mechanism for the fan blades 34 for optimizing performance and providing a reverse thrust capability. However, these prior art devices provide only for fixed pitch inlet and outlet guide vanes, 38 and 40, respectively, optimized for either one operative point for the fan blades 34, or oriented at a compromise position between two normal operating conditions. The present invention eliminates the restrictions and compromises found in such prior art devices.

In one preferred embodiment of the present invention, the fan blades 34 are operatively connected to a variable pitch actuating mechanism 13, disposed between the fan blades 34 and shaft 16, which is capable of changing the pitch of the fan blades 34 during blade rotation. Additionally, the guide vanes 38, 40, are provided with actuator arms 39, 41, respectively, operatively connected to a state of the art control means 43 of standard construction capable of varying the vane pitch.

To change from the forward to the reverse thrust modes, the fan blades 34 are actuated counterclockwise looking from the blade tip of the variable pitch fan assembly 12 from their normal position A (FIGS. 2 and 5), through the feathered position B, to their reverse thrust orientation C. While in the forward thrust mode, the fan assembly 12 typically operates at point D, which moves along the operating line 44. As the fan blades 34 are actuated counterclockwise through feather, however, point D migrates up the operating line 44, until it reaches point E, the intersection of the operating line 44 and stall line 46, at which point the flow is no longer capable of remaining attached to the fan blades due to the extremely adverse incidence angle of the flow with respect to the blades and fan blade stall occurs. If, however, prior to the fan transition through feather, the inlet guide vanes 38 are closed from their normal position G to a position represented by H in FIGS. 2 and 5, the reduction in air flow due to the closure of the inlet guide vanes 38 will drive the fan assembly 12 down its operating line 44 from point D to point F. This establishes the equivalent of increased stall margin. If the inlet guide vanes 38 and fan blades 34 are scheduled to operate simultaneously in a predetermined relationship, the operating point of the fan assembly 12 may not migrate far from position D at all.

When the fan blades 34 approach their most critical orientation, the inlet guide vanes 38 may be scheduled to position J, thereby effectively blocking off and controlling the fan air flow. As the fan blades 34 are further scheduled to their normal reverse thrust operating orientation C, the inlet guide vanes 38 are actuated open in the counterclockwise direction, thereby "easing in" the fan air flow. Ultimately, the inlet guide vanes 38 are scheduled to position K corresponding to the normal reverse pitch orientation C of fan blades 34. Concurrently, the outlet guide vanes 40 may be scheduled from their normal operating position L to some preferred reverse thrust orientation M. Conversely, the flow may be controlled primarily by the outlet guide vanes 40 rather than by the inlet guide vanes 38, with the inlet guide vanes concurrently assuming some preferred reverse thrust orientation. Such a method may be most advantageous when transiting from the reverse to the forward thrust modes. The degree of movement of the inlet and outlet guide vanes 38 and 40, respectively, necessary to keep fan stresses at an acceptable level will depend on the particular fan blade aerodynamic properties.

This invention is equally applicable when the fan blades 34 change from the forward to the reverse thrust mode through flat pitch rather than through feather. In this situation, the rotation of the fan blades 34 and the guide vanes 38 and 40 about their radially extending axes would be just the opposite of that shown in FIGS. 2 and 5.

In an alternative embodiment as shown in FIG. 4, the inlet guide vanes 38 and outlet guide vanes 40 are provided with movable flaps 48, 50, respectively, to vary blade camber, and therefore pitch as defined herein, in a manner more fully described and claimed by L. H. Smith, Jr. in U.S. Pat. No. 3,442,493 — May 6, 1969, which patent is assigned to the same assignee as the present invention. As the fan blades 34 are changed from the forward thrust mode position A to the reverse thrust orientation C, the flaps 48 and 50 are scheduled from their normal positions N, P, respectively, to positions Q, R, respectively, thereby re-orienting the air flow to reduce aerodynamically induced stresses.

It should be obvious to one skilled in the art that certain changes can be made to the above-described invention without departing from the broad inventive concepts thereof. For example, it may be desirable to eliminate either the inlet or outlet guide vanes 38, 40, respectively, or to have one set or the other be stationary. In another application it may be advantageous to have the inlet guide vanes 38 variable in pitch by rotating the entire vane and the outlet guide vanes 40 variable in pitch through a change in camber, or vice versa. Yet another embodiment would combine variable camber and pitch in either the inlet or outlet guide vanes 38, 40, respectively. It is intended that the appended claims cover these and all similar variations in the Inventor's broader inventive concept.

What I claim is:

1. In a method of operating a gas turbine engine having a rotatable fan and in which at least one stage of fan blades is rotating to provide a forward propulsive thrust, the pitch of the rotating stage of fan blades being changed for the purpose of reversing the direction of gas flow therethrough, the step of:
   reversing the pitch of at least one stage of essentially radial, nonrotatable, variable guide vanes, which are axially disposed with respect to said rotating fan blades, in a predetermined relationship with the change in pitch of said fan blades to reduce aerodynamically induced stresses in said fan blades as said fan blades change between the forward and the reverse thrust modes.

2. The improved method of claim 1 additionally comprising the step of reversing the pitch of two stages of guide vanes, one disposed axially upstream and the other disposed axially downstream of the fan blades in the forward thrust mode, wherein said scheduling is accomplished in a predetermined relationship with the change in pitch of said fan blades to further reduce aerodynamically induced stresses as said fan blades change between the forward and the reverse thrust modes.

3. The improved method of claim 1 further characterized in that the change in pitch of said guide vanes is achieved by rotating said guide vanes about their essentially longitudinal axes.

4. The improved method of claim 1 further characterized in that the change in pitch of said guide vanes is achieved by changing the camber of said guide vanes.

5. The improved method of claim 3 still further characterized in that said fan blades and said variable guide vanes are scheduled to change pitch in the same direction of rotation about their blade longitudinal axes.

6. In a gas turbine engine incorporating a rotatable fan with blades operating at a first pitch angle during some portions of operation to provide forward thrust and a second pitch angle during other portions of operation to provide reverse thrust, the improvement comprising:
   at least one stage of essentially radial, nonrotatable guide vanes axially disposed with respect to said fan, said vanes being adjustable in geometry about the vane longitudinal axes, and
   control means to reverse the pitch of said vanes in a predetermined relationship with the change in pitch of the fan blades as the fan is changed between the forward and reverse thrust modes, so as to reduce aerodynamically induced stresses during the transition between the forward and reverse thrust modes.

7. The gas turbine engine of claim 6 wherein said guide vanes are axially disposed upstream of the fan blades in the forward thrust mode.

8. The gas turbine engine of claim 6 wherein said guide vanes are axially disposed downstream of the fan blades in the forward thrust mode.

9. The gas turbine engine of claim 6 additionally comprising two stages of essentially radial, nonrotatable guide vanes, one disposed axially upstream and the other disposed axially downstream with respect to said fan blades, said second stage being variable in pitch and operatively connected to said control means such that variation in pitch cooperates to further reduce stresses as the fan blades are changed between the forward and reverse thrust modes.

10. The gas turbine engine of claim 9 wherein the change in pitch of said vanes is achieved by a rotation of said guide vanes about their essentially longitudinal axes.

11. The gas turbine engine of claim 9 wherein the change in pitch of said vanes is achieved by a change in camber of said guide vanes.

12. A turbofan engine comprising:
   a core engine for use in a nacelle, said core engine including, in series flow relationship, an axial flow compressor having rotor and stator assemblies, a combustor to which pressurized air from the compressor and fuel are delivered for combustion therein to provide a hot gas stream, a first turbine downstream of said combustor adapted to be rotatably driven by said hot gas stream, and a shaft drivingly connecting said compressor rotor and said first turbine;
   a second turbine rotatable independently of the rotatable elements of the core engine, said second turbine also for use in said nacelle, disposed downstream of said first turbine and adapted to be rotatably driven by said hot gas stream;
   a generally annular duct having an inlet and an outlet and for disposition about at least a portion of said core engine;

a fan assembly disposed in said duct for pressurizing air flow through said duct, said second turbine drivingly connected to said fan, and including at least one stage of radially extending fan blades adapted to be variable in pitch, said fan blades operating at a first pitch angle during certain portions of operation to provide forward thrust and at a second pitch angle during other portions of operation to provide reverse thrust; at least one stage of essentially radial, nonrotatable inlet guide vanes axially disposed with respect to said fan blades, said stage of guide vanes being adjustable in pitch about their respective blade longitudinal axes; and control means to reverse the pitch of said stage of vanes in a predetermined relationship with the change in pitch of the fan as the fan is changed between the forward and reverse thrust modes, to reduce aerodynamically induced stresses during the transition.

13. The gas turbine engine of claim 12 wherein said guide vanes are axially disposed upstream of the fan blades in the forward thrust mode.

14. The gas turbine engine of claim 12 wherein said guide vanes are axially disposed downstream of the fan blades in the forward thrust mode.

15. The gas turbine engine of claim 12 additionally comprising two stages of essentially radial, nonrotatable guide vanes, one disposed axially upstream and the other disposed axially downstream with respect to said fan blades, said second stage being variable in pitch and operatively connected to said control means such that variation in pitch cooperates to further reduce stresses as the fan blades are changed between the forward and reverse thrust modes.

16. A method of operating a gas turbine engine which includes the steps of:

pressurizing air flowing through a fan assembly disposed in a generally annular duct having an inlet and an outlet, said assembly comprising a stage of variable pitch fan blades and at least one stage of essentially radial, nonrotatable, variable pitch guide vanes axially disposed with respect to said fan blades, further pressurizing a first predetermined portion of said air flow through an axial flow compressor having rotor and stator assemblies, mixing the pressurized air from the compressor with a vaporized fuel to form a combustible mixture, combusting said mixture in a combustor to provide a hot gas stream, expanding said hot gas stream through a first turbine disposed downstream of said combustor, adapted to be rotatably driven by said hot gas stream, and drivingly connected through a first shaft to said compressor rotor, further expanding said hot gas stream through a second turbine disposed downstream of said first turbine, independently rotatable from the compressor rotor, and drivingly connected through a second shaft to said fan assembly, still further expanding said hot gas stream through a first nozzle disposed downstream of said second turbine, and expanding a second predetermined portion of said pressurized air flow from said fan assembly through a second annular nozzle disposed downstream of said fan assembly, changing the pitch of said fan blades for the purpose of reversing the direction of gas flow therethrough, and reversing the pitch of said guide vanes in a predetermined relationship with the change in pitch of said fan blades to reduce aerodynamically induced stresses in said fan blades as said fan blades change between the forward and the reverse thrust modes.

17. In a method of operating a gas turbine engine having a rotatable fan and in which at least one stage of the fan blades is rotating to provide a forward propulsive thrust, the pitch of the rotating stage of the fan blades being changed for the purpose of reversing the direction of gas flow therethrough, the step of:

scheduling the change in geometry of at least one stage of essentially radial, nonrotatable, variable guide vanes, which are axially disposed with respect to said rotating fan blades, in a predetermined relationship with the change in pitch of said fan blades to reduce aerodynamically induced stresses in said fan blades as said fan blades change between the forward and the reverse thrust modes, wherein said variable guide vanes are scheduled to be essentially closed when the fan blades are scheduled through their essentially maximum stress orientation.

18. In a method of operating a gas turbine engine having a rotatable fan and in which at least one stage of the fan blades is rotating to provide a forward propulsive thrust, the pitch of the rotating stage of the fan blades being changed for the purpose of reversing the direction of gas flow therethrough, the step of:

scheduling the change in geometry of at least one stage of essentially radial, nonrotatable, variable guide vanes, which are axially disposed with respect to said rotating fan blades, in a predetermined relationship with the change in pitch of said fan blades to reduce the aerodynamically induced stresses in said fan blades as said fan blades change between the forward and reverse thrust modes, wherein said variable guide vanes are scheduled to be essentially closed prior to scheduling the fan blades to their essentially maximum stress orientation.

19. In a gas turbine engine incorporating a rotatable fan with blades operating at a first pitch angle during some portions of operation to provide forward thrust and a second pitch angle during other portions of operation to provide reverse thrust, the improvement comprising:

at least one stage of essentially radial, nonrotatable guide vanes axially disposed with respect to said fan, said vanes being adjustable in geometry about the vane longitudinal axes, and control means to schedule the change in geometry of said vanes in a predetermined relationship with the change in pitch of the fan blades as the fan is changed between the forward and reverse thrust modes, so as to reduce aerodynamically induced stresses during the transition between the forward and reverse thrust modes, wherein the guide vanes are operatively connected to the fan blades through said control means such that said guide vanes are essentially closed when said fan blades are scheduled through their maximum stress orientation.

* * * * *